(12) United States Patent
Brown

(10) Patent No.: US 10,079,679 B2
(45) Date of Patent: Sep. 18, 2018

(54) CRYPTOGRAPHIC ENCRYPTION KEY ESCROW AND RECOVERY

(71) Applicant: Bank of America Corporation, Charlotte, NC (US)

(72) Inventor: Floyd A Brown, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 202 days.

(21) Appl. No.: 15/141,424

(22) Filed: Apr. 28, 2016

(65) Prior Publication Data
US 2017/0317824 A1 Nov. 2, 2017

(51) Int. Cl.
| | | |
|---|---|---|
| *H04L 29/06* | (2006.01) | |
| *H04L 9/08* | (2006.01) | |
| *G06F 21/31* | (2013.01) | |
| *G06F 21/40* | (2013.01) | |
| *G06F 21/32* | (2013.01) | |
| *H04L 9/00* | (2006.01) | |

(52) U.S. Cl.
CPC ............ *H04L 9/0894* (2013.01); *G06F 21/31* (2013.01); *G06F 21/32* (2013.01); *G06F 21/40* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 5,940,507 A * | 8/1999 | Cane | ................... | G06F 21/6245 380/277 |
| 7,065,653 B1 * | 6/2006 | Yoneda | ............ | G11B 20/00086 713/189 |
| 7,953,978 B2 * | 5/2011 | Greco | ................... | H04L 63/062 380/278 |

(Continued)

FOREIGN PATENT DOCUMENTS

CN 100583115 C 1/2010

OTHER PUBLICATIONS

Mar. 2012—Wang, Qingping et al., "A Transactional Memory with Automatic Performance Tuning," ACM Transactions on Architecture and Code Optimization, vol. 9, No. 4.

(Continued)

*Primary Examiner* — Eric Chen
(74) *Attorney, Agent, or Firm* — Banner & Witcoff, Ltd.; Michael A. Springs

(57) ABSTRACT

Various features described herein may include supervision or control of a cryptographic signal necessary for encryption or decryption. Specifically, key management may be performed, wherein the key is deposited or retrieved to or from a third party. For example, data may be encrypted. The encrypted data may be unencrypted by using a key, which may be stored on a different device (e.g., a server). The different device may perform authenticating a device requesting access to the key, determining a recovery key for the encrypted data, and providing the recovery key for the encrypted data. The recovery key may then be used to (Continued)

recover access to the encrypted data. Thus, the key may be deposited for escrow by the different device until such time that the key is necessary for recovery of the encrypted data, at which time the key may be retrieved for decryption of the encrypted data.

26 Claims, 9 Drawing Sheets

(56) References Cited

U.S. PATENT DOCUMENTS

| | | | |
|---|---|---|---|
| 8,612,766 B2 | 12/2013 | Thom et al. | |
| 8,839,353 B2 | 9/2014 | Thom et al. | |
| 9,015,490 B2 | 4/2015 | Thom et al. | |
| 9,094,379 B1 | 7/2015 | Miller | |
| 9,768,952 B1* | 9/2017 | Allo | H04L 9/083 |
| 9,800,562 B2* | 10/2017 | Lalwani | H04L 9/0894 |
| 2008/0005030 A1* | 1/2008 | Schlarb | G06F 21/10 |
| | | | 705/57 |
| 2008/0232598 A1* | 9/2008 | Vennelakanti | G06F 21/602 |
| | | | 380/279 |
| 2013/0212367 A1 | 8/2013 | Ingalls et al. | |
| 2016/0063785 A1* | 3/2016 | Benkert | G07C 9/00309 |
| | | | 340/5.23 |

OTHER PUBLICATIONS

Dec. 2014—Ruivo, Pedro et al., "Data protection in services and support roles—a qualitative research amongst ICT professionals," Procedia Technology 16 (2014) 710-717.
Feb. 2014—Kashyap. V. et al., "Privacy Shielding against Mass Surveillance," International Journal of Engineering Trends and Technology (IJETT), vol. 8, No. 2.
2013—Balogun, Adedayo M. et al., "Privacy Impacts of Data Encryption on the Efficiency of Digital Forensics Technology," (IJACSA) International Journal of Advanced Computer Science and Applications, vol. 4, No. 5, 2013.
2012—Isa, Mohd Anuar Mat et al., "Integrity Verification Architecture (IVA) Based Security Framework for Windows Operating System," 2012 IEEE 11th International Conference on Trust, Security and Privacy in Computing and Communications.
Aug. 2013—Penrose, Philip et al., "Approaches to the classification of high entropy file fragments," Digital Investigation 10 (2013) 372-384.
Jan. 2012—Yang, Chung-Huang et al., "Design and Implementation of Forensic Systems for Android Devices based on cloud Computing," Appl. Math. Inf. Sci. 6 No. 1S pp. 243S-247S (2012).
Dec. 2012—Young, Joel et al., "Distinct Sector Hashes for Target File Detection," Computer, vol. 45, No. 12, pp. 28-35.
Jan. 2012—Nguyen, Anh et al., "Delusional boot: Securing Cloud Hypervisors without Massive Re-engineering," EuroSys'12.
2012—Imai, Takumi et al., "Method to accelerate the resume transition for hibernation by selective swapout in computer system," The 1st IEEE Global Conference on Consumer Electronics 2012, 509-513.
2015—Ruivo, Pedro et al., "Success Factors for Data Protection in Services and Support Roles: Combining Traditional Interviews with Delphi Method," International Journal of Human Capital and Information Technology Professionals, 6 (3), 56-70, Jul.-Sep. 2015.
Dec. 2013—Abdul, Arif Mohammad et al., "Trusted System in Cloud Environment," International Journal of Engineering Research & Technology, vol. 2, Issue 12, 865-869.
Mar. 2014—Li, Li et al., "Stateful Security Protocol Verification".
Jun. 2013—Sobh, Tarek S., "Information Leakage Prevention Using Virtual Disk Drive" I.J. Computer Network and Information Security, 2013, 8, 19-27.
Dec. 2012—An, Dokjun et al., "SDMS-based Disk Encryption Method".
2013—Salah, Khaled et al., "Analyzing the security of Windows 7 and Linux for cloud computing," Computers & Security 34 (2013) 113-122.

\* cited by examiner

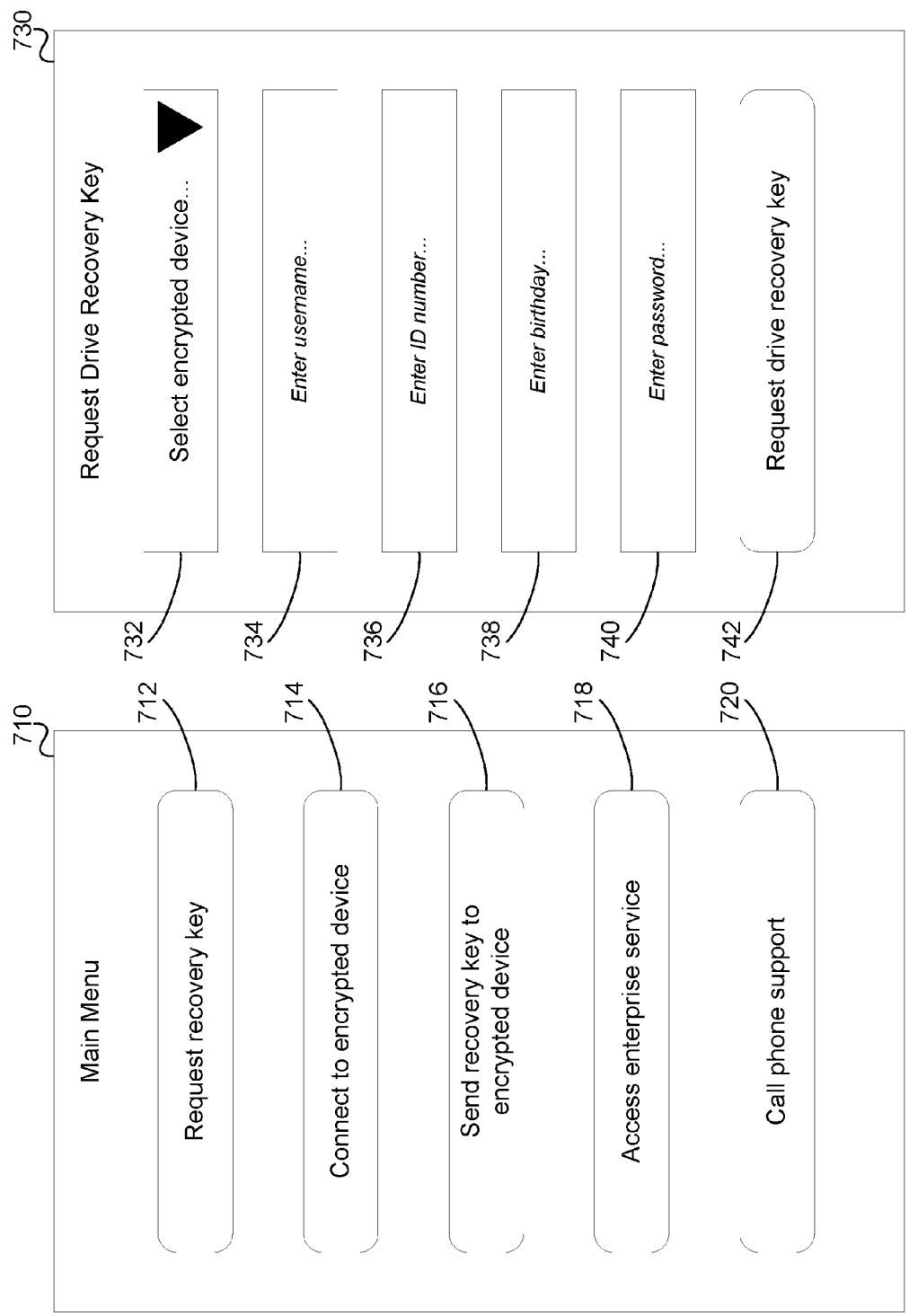

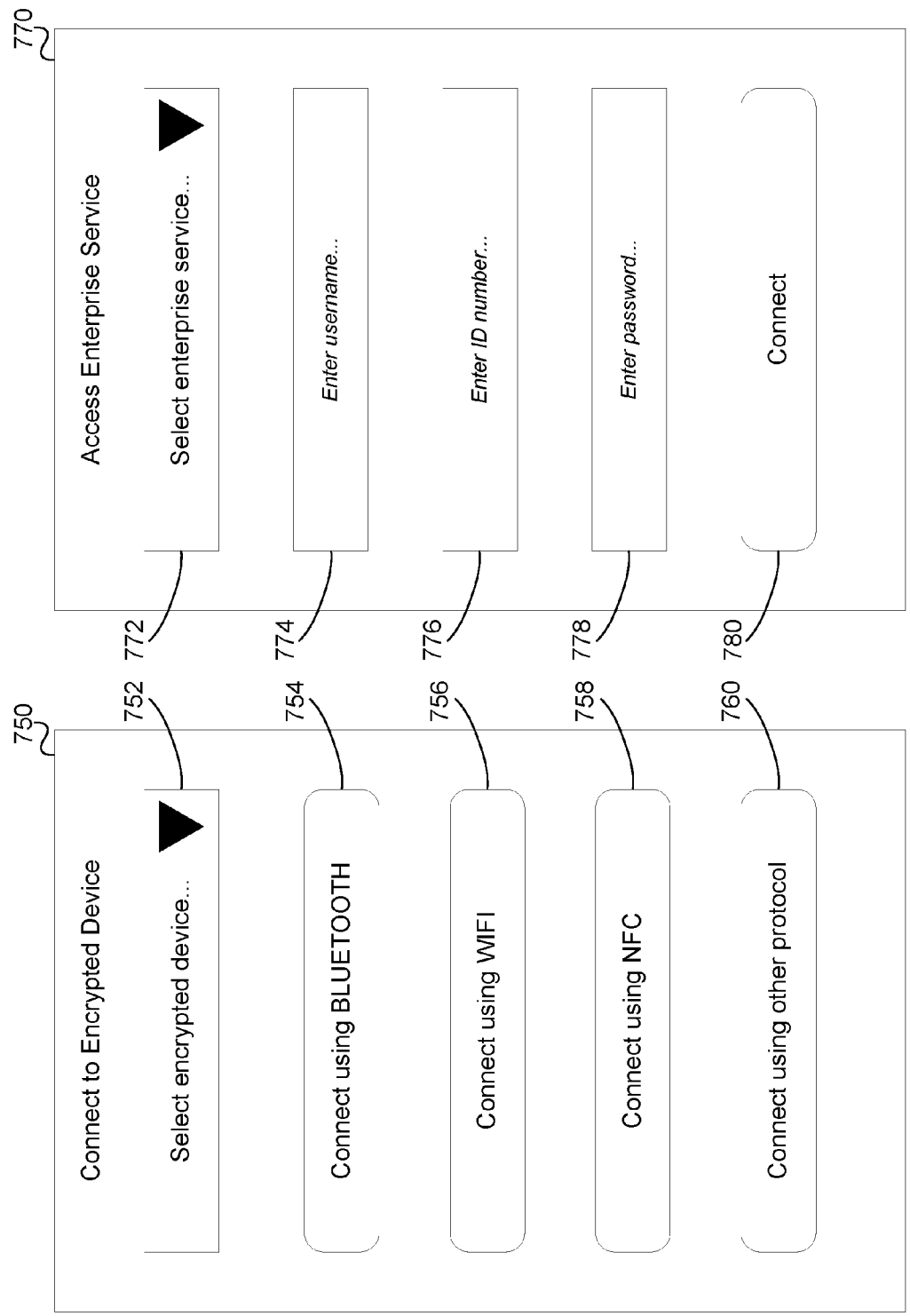

CRYPTOGRAPHIC ENCRYPTION KEY ESCROW AND RECOVERY

BACKGROUND

Businesses, organizations, and consumers increasingly deal with vast amounts of digital information. Encrypted storage allows for secure storage of digital documents, photographs, and other information. At the same time, use of encrypted or otherwise securely stored data may be less convenient, especially due to technical malfunctions or other problems. An encryption key may be deposited to a third party for escrow. The encryption key may be retrieved from the third party for recovery of encrypted data. To improve both security and usability, there is a need for an increasingly easy and convenient way to both securely store data, and access securely stored data.

SUMMARY

The following summary is for illustrative purposes only, and is not intended to limit or constrain the detailed description.

Aspects of the disclosure provide effective, efficient, scalable, and convenient technical solutions that address and overcome the technical problems associated with whole- and partial-disk encryption, including placing a recovery key in escrow, and securely connecting, authenticating, and retrieving the recovery key for use in decryption of the encrypted disk or device.

In accordance with one or more embodiments, a computing device having at least one processor, memory, and a communication interface may receive authentication information for a user, the authentication information including an identification number of the user and a birthday of the user, authenticate the user based on the authentication information, receive a request to provide a drive-encryption recovery key for an encrypted device that is a member of a domain associated with an enterprise, the request including an identifier of the encrypted device, the encrypted device being associated with the user, the encrypted device being encrypted using a whole-disk encryption method, the drive-encryption recovery key including a string that, when provided to the encrypted device, causes the encrypted device to allow access to the encrypted device, the drive-encryption recovery key being unique to the encrypted device, determine the drive-encryption recovery key for the encrypted device, and transmit the drive-encryption recovery key to a user device associated with the user, the user device being different from the encrypted device.

In some embodiments, the method may include receiving registration information for the user, the registration information including a phone number associated with the user device. In some embodiments, transmitting the drive-encryption recovery key to the user device associated with the user includes sending, to the phone number, a short message service (SMS) message including the drive-encryption recovery key to the user device.

In some embodiments, the method may include determining whether the user device is within a threshold proximity of the encrypted device. In a case that the user device is not within a threshold proximity of the encrypted device, the method may include requesting additional authentication information before transmitting the drive-encryption recovery key, and transmitting the drive-encryption recovery key to a different user device associated with the user.

In some embodiments, the registration information for the user includes an identifier of the different user device associated with the user. In some embodiments, transmitting the drive-encryption recovery key to the different user device associated with the user includes transmitting the drive-encryption recovery key to the different user device using the identifier of the different user device.

In some embodiments, receiving the authentication information for the user includes receiving the authentication information via a secure application installed on the user device associated with the user. In some embodiments, transmitting the drive-encryption recovery key to the user device associated with the user includes transmitting the drive-encryption recovery key to the secure application installed on the user device associated with the user.

In some embodiments, the method may include transmitting, by the secure application installed on the user device, the drive-encryption recovery key to the encrypted device, thereby causing the encrypted device to be accessible by the user.

In some embodiments, receiving the authentication information for the user may include receiving the authentication information from the user via an automated telephone support system. In some embodiments, receiving the request to provide the drive-encryption recovery key for the encrypted device may include receiving the request via the automated telephone support system. In some embodiments, the method may include determining whether a telephone number of a telephone the user is using to access the automated telephone support system is the phone number associated with the user device. In a case that the telephone number of the telephone the user is using to access the automated telephone support system is the phone number associated with the user device, the method may include performing an accelerated authentication of the user. In a case that the telephone number of the telephone the user is using to access the automated telephone support system is not the phone number associated with the user device, the method may include performing additional authentication of the user, and providing the drive-encryption recovery key to the user via the automated telephone support system.

In some embodiments, the method may include transferring the request to provide the drive-encryption recovery key to an identity manager system. In some embodiments, transmitting the drive-encryption recovery key to the user device may include transmitting, by the identity manager system, the drive-encryption recovery key. In some embodiments, the identity manager system is in communication with the domain associated with the enterprise. In some embodiments, the identity manager system may include a self-service identity manager that manages at least one of identities, credentials, and role-based access control policies.

In some embodiments, the method may include determining a location of the encrypted device. In a case that the location of the encrypted device is different from a location of the enterprise, the method may include requesting additional authentication information before transmitting the drive-encryption recovery key.

In some embodiments, the method may include receiving identification information for a trusted person different from the user, the trusted person being a member of the enterprise. In some embodiments, the method may include determining a location of the user device associated with the user, and/or determining a location of a trusted device associated with the trusted person. In a case that both the location of the encrypted device is different from a location of the enterprise, and the location of the user device associated with the user is different from the location of the trusted device associated with the trusted person, the method may include determining whether the location of the trusted device is within a threshold proximity of the encrypted device. In a case that the location of the trusted device is within the threshold proximity of the encrypted device, the method may include transmitting the drive-encryption recovery key to the trusted device.

In a case that the location of the encrypted device is at the location of the enterprise, the method may include transmitting, over a network of the enterprise, to the encrypted device, a trusted key different from the drive-encryption recovery key. The trusted key may cause the encrypted device to allow access to the encrypted device.

In some embodiments, the method may include providing access to an enterprise service of the enterprise, based on the authenticating the user. In some embodiments, the authentication information for the user may include additional authentication information. In a case that the additional authentication information is a first type of authentication information, providing the access to the enterprise service may include providing access to a first enterprise service of the enterprise. In a case that the additional authentication information is a second type of authentication information different from the first type of authentication information, providing the access to the enterprise service may include providing access to a second enterprise service of the enterprise, the second enterprise service being different from the first enterprise service.

In a case that the additional authentication information is a first type of authentication information, transmitting the drive-encryption recovery key to the user device may include transmitting the drive-encryption recovery key to the user device via a first transmission method. In a case that the additional authentication information is a second type of authentication information different from the first type of authentication information, transmitting the drive-encryption recovery key to the user device may include transmitting the drive-encryption recovery key to the user device via a second transmission method different from the first transmission method.

In some embodiments, the method may include receiving a media access control (MAC) address of the user device associated with the user, and/or storing the MAC address of the user device associated with the user in a user profile of the user. In some embodiments, the method may include, responsive to the request, retrieving the MAC address of the user device associated with the user from the user profile of the user. In some embodiments, transmitting the drive-encryption recovery key to the user device associated with the user may include transmitting a packet including the drive-encryption recovery key and the MAC address of the user device.

In some embodiments, the method may include recording one or more words spoken by the user, and/or performing voice recognition of the user, the voice recognition being based on the one or more words spoken by the user. In some embodiments, authenticating the user based on the authentication information may include authenticating the user based on the voice recognition of the user.

In some embodiments, the method may include, before transmitting the encrypting the drive-encryption recovery key to the user device, encrypting the drive-encryption recovery key by using a MAC address of the user device as a public encryption key. In some embodiments, the user device may use a private decryption key corresponding to the MAC address of the user device to decrypt the encrypted drive-encryption recovery key.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying drawings in which like numerals indicate similar elements.

FIGS. 7A-7D depict illustrative graphical user interfaces that may be used to implement various features described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
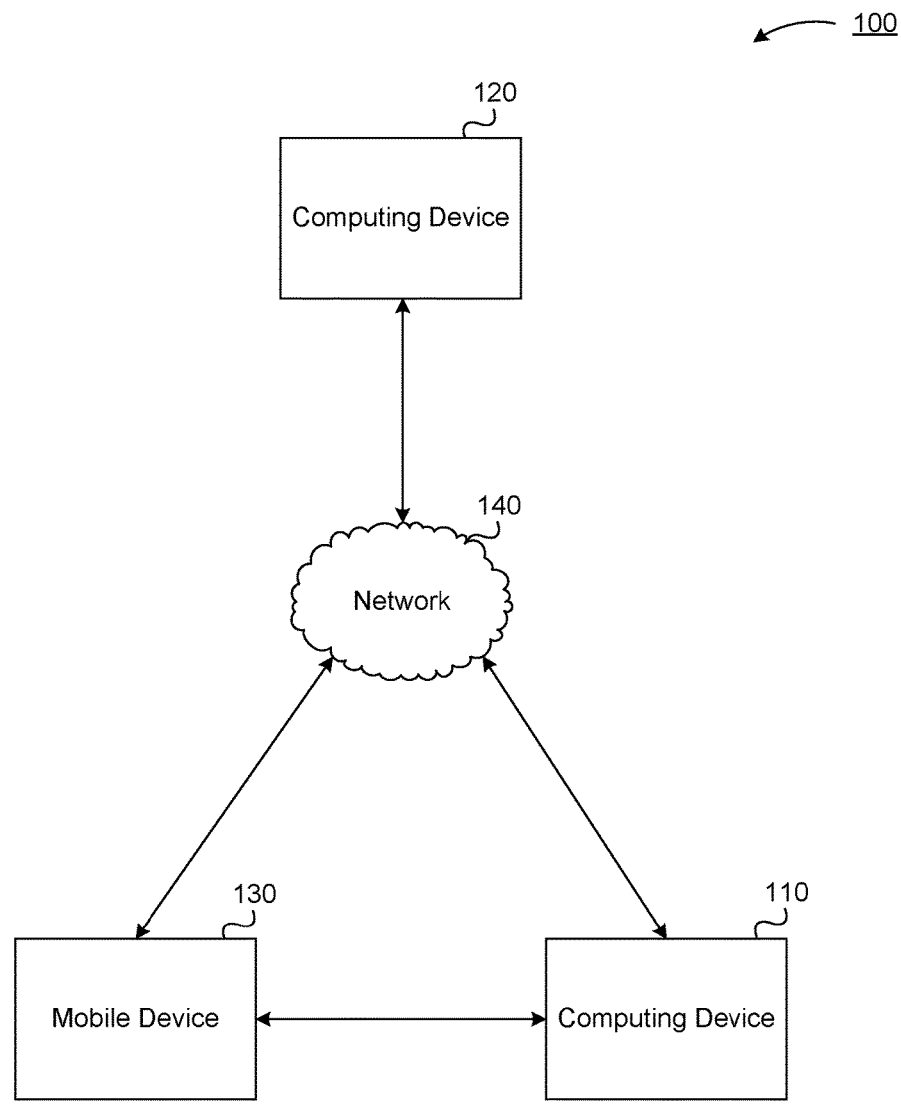
FIG. 1A depicts an illustrative computing environment in which various features described herein may be implemented.

FIG. 1A depicts an illustrative computing environment for managing incidents related to encrypted storage devices. Computing environment 100 may include one or more computing devices. For example, computing environment 100 may include a computing device 110, a computing device 120, and a mobile device 130.

Computing device 110 may be a device with encrypted storage. For example, computing device 110 may include one or more hard drives, memories, computer-readable media, partitions, or the like, that are encrypted in whole or in part. For example, computing device 110 is illustrated in greater detail in connection with FIG. 2.

Regarding FIG. 1A, mobile device 130 may be configured to be used by a client of an organization, an employee of an organization, an individual (e.g., home user), a volunteer, an administrator, or the like. Mobile device 150 may include one or more communication interfaces, which may be used to communicate using a wired or wireless connection with, for example, computing device 110 or computing device 120. Communication with other devices may be direct (e.g., using a wireless or wired connection) or indirect (e.g., via one or more other devices, such as devices in network 140). Mobile device 130 may include a geographic location radio device (e.g., global positioning system (GPS) radio). Mobile device 130 may be configured to receive and/or send one or more drive encryption recovery keys.

Computing device 120 may be configured to receive one or more requests for a drive-encryption recovery key for an encrypted device. Computing device 120 may be configured to receive user authentication information, and authenticate a user and/or a user device based on the user authentication information. Computing device 120 may be configured to determine, retrieve, and/or generate the drive-encryption recovery key for the encrypted device, and send the drive-encryption recovery key for the encrypted device to one or more other devices, via one or more transmission methods (e.g., email, short message service (SMS), multimedia messaging service (MMS), facsimile, telephone, internet protocol (IP), or the like). Computing device 120 may be one or more devices (e.g., a system, a server, a server farm).

In one or more arrangements, computing device 110, computing device 120, and mobile device 130 may be any type of computing device capable of receiving a user interface, receiving input via the user interface, and communicating the received input to one or more other computing devices. For example, computing device 110, computing device 120, and mobile device 130 may, in some instances, be and/or include server computers, desktop computers, laptop computers, tablet computers, smart phones, or the like. As noted above, and as discussed in greater detail below, any and/or all of computing device 110, computing device 120, and mobile device 130 may, in some instances, be special-purpose computing devices configured to perform specific functions.

Figure 1B:
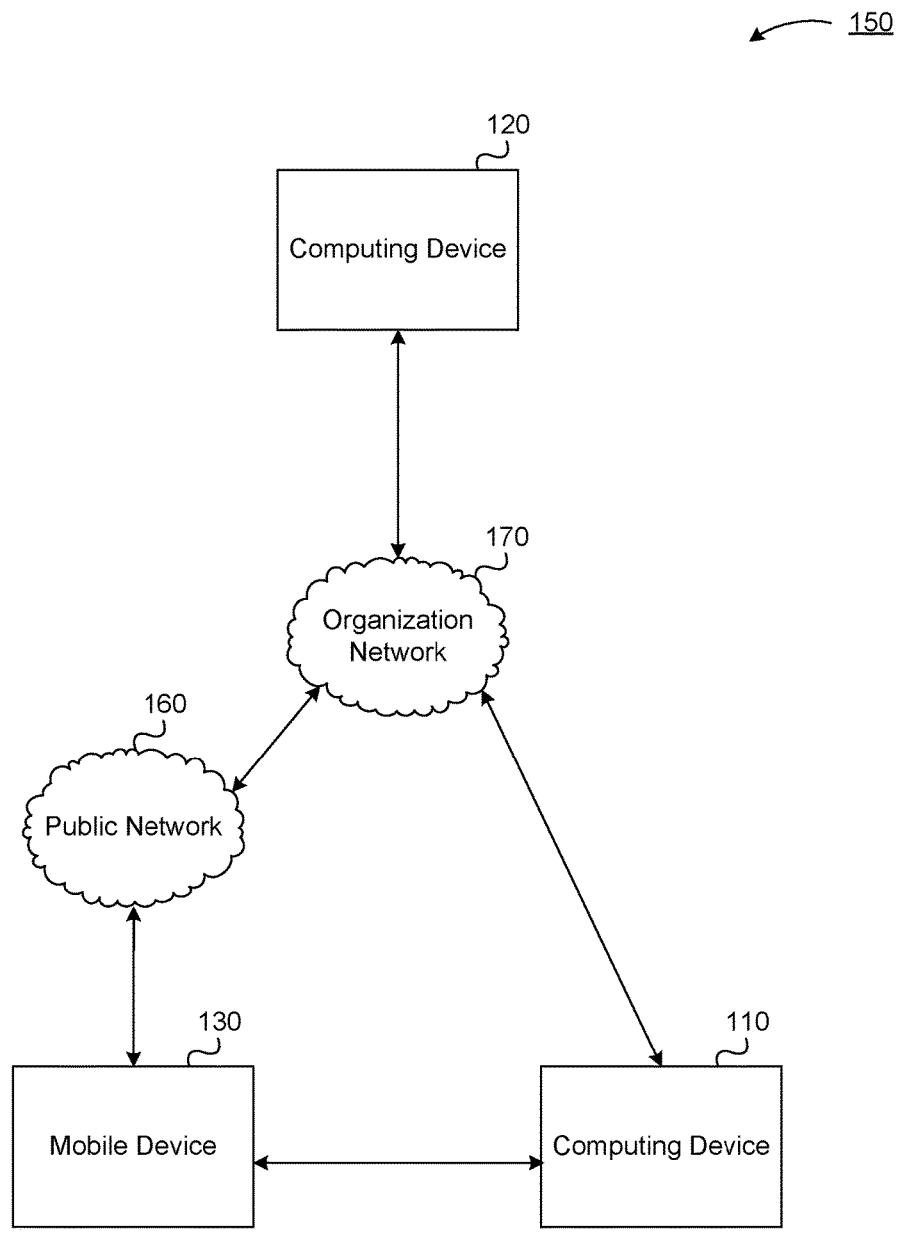
FIG. 1B depicts an illustrative computing environment in which various features described herein may be implemented.

Computing environment 100 also may include one or more networks, which may interconnect one or more of computing device 110, computing device 120, and mobile device 130. For example, computing environment 100 may include network 140 as depicted in FIG. 1A. In another example, computing environment 150 may include organization network 170 and public network 160, as depicted in FIG. 1B. Organization network 170 and/or public network 160 may include one or more sub-networks (e.g., local area networks (LANs), wide area networks (WANs), or the like). Organization network 170 may be associated with a particular organization (e.g., a corporation, educational institution, governmental institution, or the like) and may interconnect one or more computing devices associated with the organization. For example, computing device 110, computing device 120, and mobile device 130 may be associated with an organization, and organization network 170 may be associated with and/or operated by the organization, and may include one or more networks (e.g., LANs, WANs, virtual private networks (VPNs), domains, or the like) that interconnect computing device 110, computing device 120, mobile device 130, and one or more other computing devices and/or computer systems that are used by, operated by, and/or otherwise associated with the organization. Public network 160 may connect organization network 170 and/or one or more computing devices connected thereto (e.g., computing device 110, computing device 120) with one or more networks and/or computing devices that are not associated with the organization. For example, mobile device 130 may be owned by an employee of the organization, but might not always be connected to organization network 170 (e.g., because the employee of the organization is travelling, working from home, and the like). In some examples, computing device 110 may be connected to organization network 170 (e.g., via a virtual private network (VPN)), while mobile device 130 is not connected to organization network 170 (e.g., mobile device 130 is connected to public network 130). In another example, computing device 110 and mobile device 130 may both be connected to organization network 170 (e.g., if mobile device 130 is owned by an employee of the organization that owns organization network 170, and the employee is at work with mobile device 130 and computing device 110).

In another example, mobile device 130 may be owned by someone associated with the employee of the organization (e.g., a spouse, a family member, a friend). Public network 160 may include one or more networks (e.g., the Internet) that connect mobile device 130 to organization network 170 and/or one or more computing devices connected thereto (e.g., computing device 110, computing device 120). In some embodiments, mobile device 130 may directly connect to other devices (e.g., computing device 110, computing device 120) in computing environment 100 or in computing environment 150. For example, mobile device 130 may connect to one or more devices via a wireless or wired connection.

Figure 2:
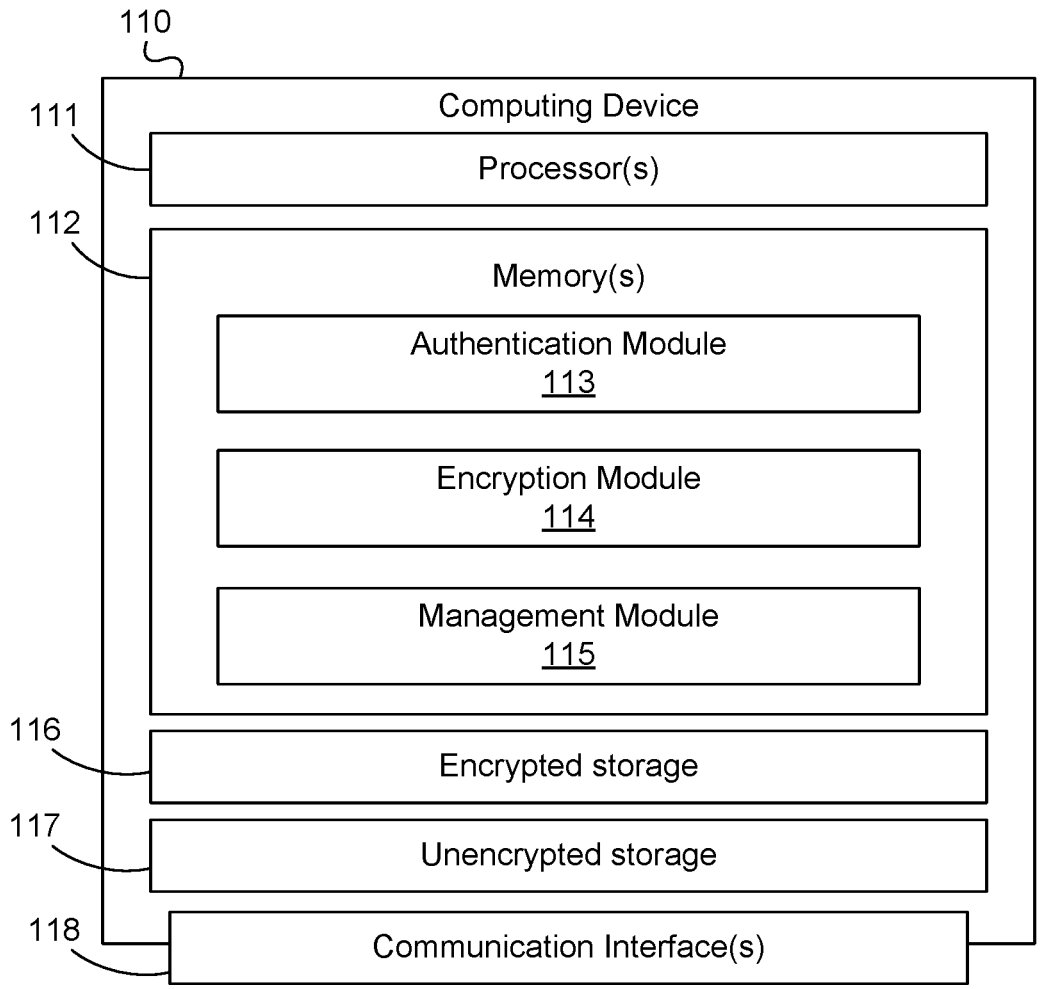
FIG. 2 depicts an illustrative computing environment in which various features described herein may be implemented.

FIG. 2 illustrates computing device 110, which may include one or more processors 111, memory 112, encrypted storage 116, unencrypted storage 117, and communication interface 118. A data bus may interconnect processor(s) 111, memory 112, encrypted storage 116, unencrypted storage 117, and communication interface 118. Communication interface 118 may be a network interface configured to support communication between computing device 110 and one or more networks (e.g., organization network 170, public network 160, or the like).

Encrypted storage 116 may include a hard drive, solid state drive, flash memory, random-access memory (RAM), read-only memory (ROM), removable storage, or the like. Encrypted storage 116 may be a partition or portion of a drive, or may be an entire drive. Encrypted storage 116 may be encrypted using a whole-disk encryption method, or may be encrypted using a partial disk encryption method. Encrypted storage 116 may be encrypted using one or more encryption algorithms, such as Advanced Encryption Standard (AES) (e.g., in cipher block chaining (CBC) or ciphertext stealing (XTS) mode, with a 128-bit or 256-bit key, and the Elephant diffuser), Data Encryption Standard (DES), BITLOCKER, or the like.

Unencrypted storage 117 may include a hard drive, solid state drive, flash memory, RAM, ROM, removable storage, or the like. Unencrypted storage 117 may be a partition or portion of a drive, or may be an entire drive. Some embodiments might not have unencrypted storage 117.

Memory 112 may include one or more program modules having instructions that when executed by processor(s) 111 cause computing device 110 to perform one or more functions described herein and/or one or more databases that may store and/or otherwise maintain information that may be used by such program modules and/or processor(s) 111.

In some instances, the one or more program modules and/or databases may be stored by and/or maintained in different memory units of first computing device 110 and/or by different computing devices that may form and/or otherwise make up computing device 110 or that are connected to or in communication with computing device 110. For example, memory 112 may include an authentication module 113, encryption module 114, and/or management module 115.

Authentication module 113 may provide and/or perform one or more functions that may enable receiving authentication information from a user. For example, authentication information may include a user name, user identification number, user birthday, user password, and/or other authentication information. Authentication module 113 may perform authentication of a user on the local device (e.g., computing device 110), and/or authentication module 113 may transmit one or more pieces of authentication information to another device (e.g., computing device 120) for authentication of the user. In some embodiments, authenticating may include causing display of a word or phrase. Authentication module 113 may record a user speaking the word or phrase. Authentication module 113 may perform and/or transmit to another device to perform voice recognition of the user speaking the word or phrase. Authentication module may generate, request, send, and/or receive confirmation of authentication of a user. Based on a user being authenticated, authentication module 113 may allow additional functionality of computing device 110. Additional features and functions that may be performed by authentication module 113 are described in greater detail below.

Encryption module 114 may provide and/or perform one or more functions that may enable encrypting and/or one or more storage, hard drives, memories, partitions, and the like of a device (e.g., computing device 110). Encryption module 114 may run constantly while a device is turned on, encrypting and/or decrypting in real-time (or nearly real-time) files that are accessed, saved, stored, created, copied, moved, and the like. Alternatively, encryption module 114 may run periodically, encrypting and/or decrypting files that are accessed, saved, stored, created, copied, moved, and the like. Additional features and functions that may be performed by encryption module 114 are described in greater detail below.

Management module 115 may provide and/or perform one or more functions that may enable creating, setting, changing, resetting, disabling, and removing an access code, password, personal identification number (PIN), access image, access key, user profile, user settings, and the like. Management module 115 may work in conjunction with authentication module 113 and encryption module 114 to secure and/or allow access to a device (e.g., computing device 110). Additional features and functions that may be performed by management module 115 are described in greater detail below.

Figure 3:
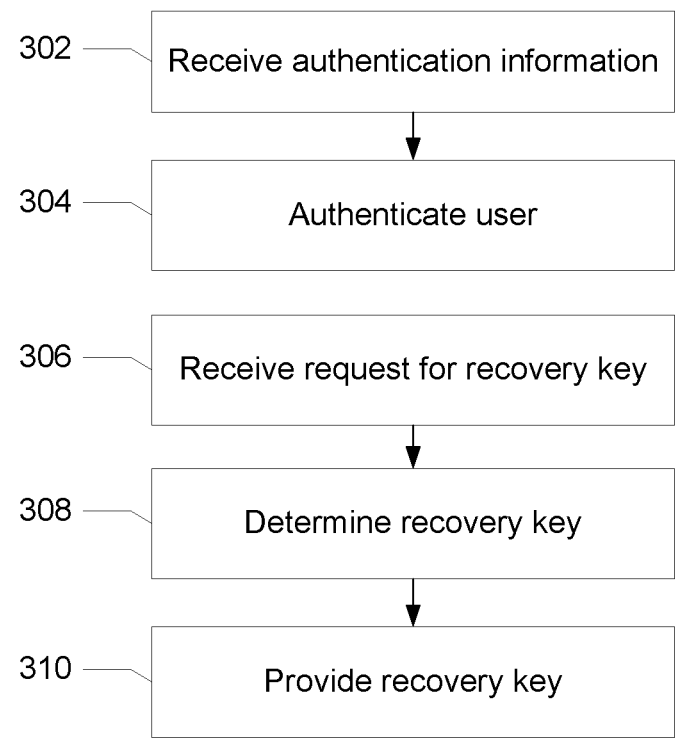
FIG. 3 depicts an illustrative process flow for a system implementing various features described herein, such as authenticating a user and providing a recovery key.

FIG. 3 depicts an illustrative flow for assisting in access recovery for a device that includes encrypted storage (e.g., encrypted storage 116). In some instances, the computing device may be connected to or a member of a domain. For example, the user may be an employee of an organization. The employee's computer may be issued to the employee by the organization. The organization information technology (IT) department may maintain one or more domains, and the computing device of the employee may be joined to or a member of one or more of the domains. In some instances, the device may be encrypted using a whole-disk encryption method, such as BITLOCKER. In order to use the device (e.g., boot the device), the device may require entry of a PIN, passcode, password, or other authentication input. If the user forgets or is unable to enter the user's PIN, for example, the device may be inaccessible to the user. In order to regain access to the device, the user may be required to provide a drive-encryption recovery key. In some embodiments, the user might not have the drive-encryption recovery key, and may need to request the drive-encryption recovery key from the system (e.g., the system being administered or controlled by the organization of which the user is an employee).

In step 302, a system (e.g., computing device, server, server farm, automated telephone support system) may receive authentication information for a user. In step 304, the system may authenticate the user based on the authentication information. In some instances, the system may request and/or receive additional authentication information before authenticating the user.

In some embodiments, the system may perform an accelerated authentication of the user (e.g., if a particular piece of authentication information is provided). For example, if the user is requesting authentication from known, recognized, or usual geographic location, internet protocol (IP) address, telephone number, media access control (MAC) address, or the like, the system may perform an accelerated authentication of the user. The system may determine a location of the user based on a location of a mobile device associated with the user, a location of a computing device from which the user is accessing a web page, a location of a telephone number from which the user is calling an automated telephone support system, or the like. For example, if the user is an employee of an enterprise, and a mobile device of the user is at a location of the enterprise (e.g., at an office of the enterprise), the system may perform an accelerated authentication of the user.

Alternatively or additionally, in some embodiments, the system may require additional authentication of the user (e.g., based on one or more criteria being true). For example, if the user is requesting authentication from an unknown or unusual geographic location, internet protocol (IP) address, telephone number, media access control (MAC) address, or the like, the system may require additional authentication. For example, if the mobile device of the user is at a location different from any location of the enterprise (e.g., the mobile device is not at any office of the enterprise), the system may request additional authentication information before transmitting the recovery key.

The authentication information for the user may include an identification number of the user, a birthday of the user, a username of the user, a password or passcode of the user, an authentication image, a gesture or series of gestures, or the like. The authentication information may include biometric information (e.g., a fingerprint, a retinal scan, a voiceprint). The authentication information may include a telephone number of a telephone that the user is using to access the system. The authentication information may include a location of the user or one or more devices associated with the user.

Receiving the authentication information may include recording one or more words spoken by the user. The system may then perform voice recognition of the user, based on the one or more words spoken by the user. The system may have previously created and/or stored a voice profile of the user. The system may authenticate the user based on a pre-stored voice profile of the user, which the system could use to determine whether the voice recognition of the user based on the one or more words spoken by the user matches the voice profile of the user.

In some example embodiments, the authentication information for the user may be received via an automated telephone support system. The automated telephone support system may determine a telephone number of a telephone that is being used to access the automated telephone support system. The system may have previously stored (e.g., in a user profile of the user) one or more telephone numbers associated with the user. The system may authenticate the user based on comparing the pre-stored telephone numbers associated with the user with the telephone number of the telephone the user is using to access the automated telephone support system. If there is a match between the telephone number of the telephone the user is using to access the automated telephone support system and a telephone number on the list of pre-stored telephone numbers, then the system may authenticate the user. In some embodiments, if the telephone number matches, the system may perform an accelerated authentication of the user. For example, the system may require a smaller number of pieces of authentication information than might otherwise be required, based on the telephone number being recognized. Alternatively, if the telephone number is not recognized, in some embodiments, the system may request additional authentication information from the user.

In step 306, the system may receive a request for an encryption recovery key. An encryption recovery key may be a string that, when provided to a computing device storing encrypted data, allows access to the encrypted data. For example, a computing device with a whole-disk encrypted storage (e.g., a disk encrypted by BITLOCKER) may, when provided with a drive-encryption recovery key, allow for the computing device to be accessed, for a PIN to be reset, or the like. In some embodiments, if the computing device is connected to a domain, the user may contact an administrator of the domain to retrieve the recovery key. In some embodiments, if the computing device is not connected to a domain, the recovery key may have been saved in an online account, to a file, a flash drive, printed to hard copy, or the like.

In step 308, the system may determine the recovery key. For example, the system may retrieve a stored recovery key from a database. The drive-encryption recovery key may have been generated at the time that the encrypted device was encrypted (e.g., when BITLOCKER was enabled). In some embodiments, the drive-encryption recovery key is stored in a database in one or more of the domains of the organization. Alternatively or additionally, in some embodiments, the drive-encryption recovery key may be generated in response to the request for the drive-encryption recovery key. The recovery key may uniquely correspond to the device for which the recovery is requested. Alternatively, the recovery key may provide access to more than one device. For example, the recovery key may provide access to each device connected to the domain.

In some embodiments, the system may determine a recovery key to send based on one or more criteria. For example, the system may determine the recovery key to send based on a location of the mobile device associated with the user, and/or a location of the encrypted device. For example, if the location of the encrypted device is a location of an enterprise with which the encrypted device is associated, the system may transmit, over a network of the enterprise, to the encrypted device, a trusted key that causes the encrypted device to allow access to the encrypted device. The trusted key may be, for example, a master key that allows access to any encrypted device on a domain of the enterprise. The trusted key may be different from the recovery key, which may be unique to the encrypted device.

In step 310, the system may provide the recovery key to the user. In some embodiments, providing the recovery key may include transmitting the recovery key to a mobile device associated with the user (e.g., a cellular telephone, a smartphone, a laptop, a tablet, and the like). In some embodiments, the system may provide the recovery key to the user over the phone (e.g., if the user is requesting the recovery key via a telephone support system). In some embodiments, the system may send an email, a short-message service (SMS) message, a multimedia messaging service (MMS) message, an iMessage, a chat message, an instant message, a BlackBerry Messenger (BBM) message, a Facebook message, a WhatsApp message, a Snapchat message, a Twitter private message, and the like. The system may generate a printout of the recovery key, and cause the printout of the recovery key to be mailed via a postal service to an address associated with the user. The system may transmit the recovery key to an application on the mobile device of the user. The application may be a secure application. For example, the application may be stored on a secure memory, may require the user to provide authentication information (e.g., a PIN, a fingerprint) to access the secure application, and the like. The transmission of the recovery key may be encrypted or otherwise performed in a secure fashion (e.g., using secure sockets layer (SSL)). The system may provide the recovery key to the user in one way, or a plurality of ways. The system may send the recovery key to a device associated with a phone number stored in a user profile of the user.

The system may, in some embodiments, access a user profile of the user to determine one or more preferred methods by which the user would like to receive the recovery key. For example, the user may provide the system with one or more preferences regarding how the user would like to receive the recovery key. The user preferences may be stored in the user profile of the user, and accessed when a user requests the recovery key. In some embodiments, the user may provide, with the request for the recovery key, a preference regarding the method by which the user would like to receive the recovery key. The preference may be the same as or different from the user preferences stored in the user profile of the user. The system may perform an arbitration to determine which methods to use to provide the recovery key to the user. For example, one or more of the user preferences in the user profile may be stored with an indication that the transmission method indicated in the user profile is to always or never be used, regardless of any further indication. Therefore, even if the user requests the use of a particular transmission method with the request for the recovery key (e.g., requesting the use of a method indicated as "never use" in the user profile), the system may determine that the preferences stored in the user profile prevail, and follow the preferences stored in the user profile (e.g., and not send the recovery key using the method requested and identified in the user profile as "never use"). Alternatively, the system may, in some embodiments, determine that the preference provided with the request for the recovery key prevails over the user profile, and transmit using the method identified in the preference provided with the request for the recovery key. In some embodiments, the system may transmit the recovery key using multiple methods, including methods identified in the user profile and with the request for the recovery key. In some embodiments, the system may update the preferences stored in the user profile with the preference provided with the request for the recovery key.

In some embodiments, the system may transmit the recovery key via a first transmission method based on the user authenticating by speaking a first phrase, and the system may transmit the recovery key via a second transmission method different from the first transmission method based on the user authenticating by speaking a second phrase different from the first phrase.

Figure 4:
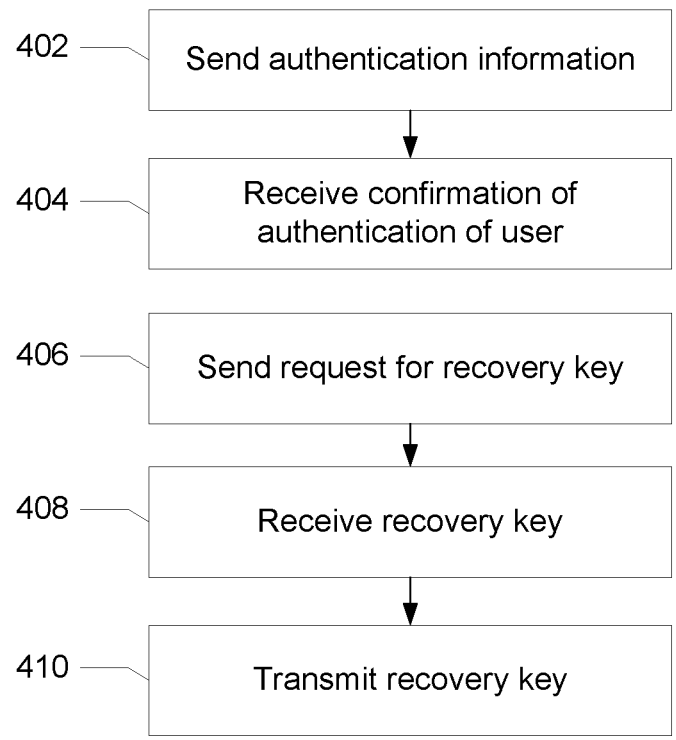
FIG. 4 depicts an illustrative process flow for a client device implementing various features described herein, such as providing user authentication information and receiving a recovery key.

FIG. 4 depicts an illustrative flow for recovering access to a device that includes encrypted storage. For example, a user may be attempting to access encrypted storage (e.g., encrypted storage 116) on a computing device (e.g., computing device 110). The user may use a different device (e.g., mobile device 130) to communicate with the system and request a recovery key.

In step 402, the device may send authentication information of the user. For example, the device may send the request to a server associated with a domain of which the computing device with the encrypted storage is a member. As discussed above in connection with FIG. 3, the authentication information may include one or more pieces of authentication information associated with the user. In response to the authentication information, in some embodiments, the device may, in step 404, receive confirmation of authentication of the user. In some instances, the device may receive a request for additional authentication information of the user, and provide the additional authentication information, before receiving the confirmation of the authentication of the user. In some instances (e.g., the authentication information was incorrect or could not be verified), the device might not receive the confirmation of the authentication, and the method may end, or the device may be required to provide new or additional authentication information.

In some instances, the device may receive a redirection to a different server or system. For example, the device may be redirected to a server to perform the authentication. After authenticating, the device may be returned to the original server, or the device may be redirected to another server for the next step in the process. One of skill in the art will understand that different servers may perform different portions of the processes described herein, or a single server or system may perform every portion of the processes herein.

In step 406, the device may send a request for a recovery key. For example, the user could initiate a request for a recovery key. The request for the recovery key may include an identifier of the device for which the recovery key is requested. For example, the request may include a MAC address, a computer name, or another identifier of the device for which the recovery key is requested.

In step 408, the device may receive the recovery key. The device may receive the recovery key via a secure transmission. The recovery key may be encrypted, or unencrypted.

After receiving the recovery key, the device may display the recovery key to the user on a display of the mobile device, so that the user can manually enter the recovery key into the computing device with the encrypted storage. After the user enters the recovery key into the computing device with the encrypted storage, the computing device with the encrypted storage may validate the recovery key, and/or allow access to the encrypted storage.

In another embodiment, in step 410, the mobile device may transmit the recovery key to the computing device with the encrypted storage, to cause the computing device with the encrypted storage to allow access to the encrypted device. For example, the mobile device may connect to the computing device with the encrypted storage via a network (e.g., public network 160 or organization network 170). Alternatively or additionally, the mobile device may connect to the computing device with the encrypted storage directly (e.g., using a near-field communication method). In some embodiments, the mobile device may be connected to the computing device wirelessly, or via a wired connection. After connecting to the computing device with the encrypted storage, the mobile device may transmit the recovery key to the computing device with the encrypted storage. After the computing device with the encrypted storage receives the recovery key, the computing device with the encrypted storage may validate the recovery key, and/or allow access to the encrypted storage.

Figure 5:
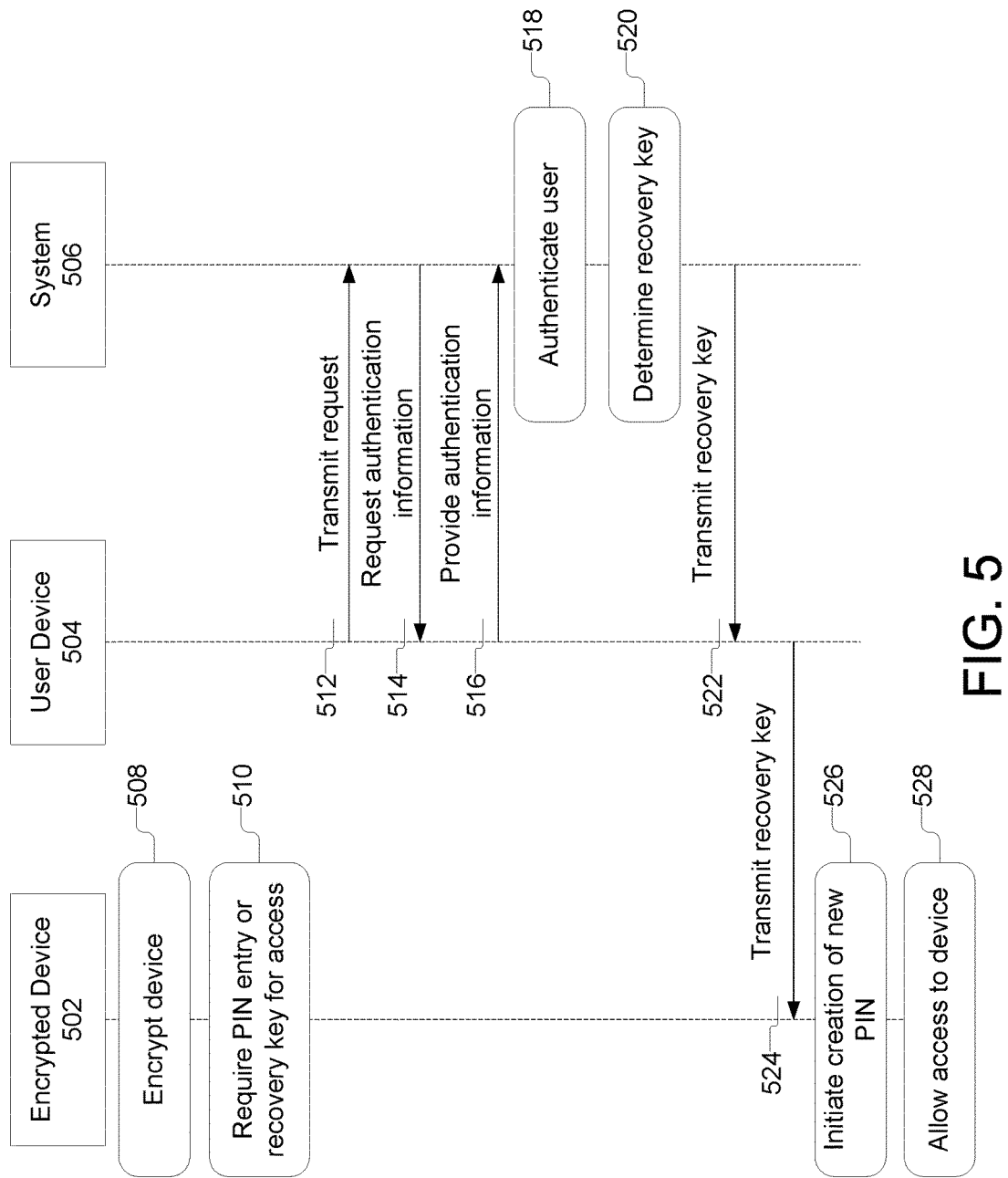
FIG. 5 depicts an illustrative system flow diagram for various devices implementing various features described herein, the various devices including, for example, an encrypted device, a user device, and a system.

FIG. 5 depicts an illustrative flow for recovering access to a device that includes encrypted storage. As depicted in FIG. 5, encrypted device 502, user device 504, and system 506 may be in communication.

Encrypted device 502 may be a computing device (e.g., a laptop, a desktop, a tablet, a smartphone, or the like) that includes an encrypted storage. Encrypted device may be encrypted using a whole- or partial-disk encryption method. For example, encrypted device 502 may be encrypted using BITLOCKER encryption. Encrypted device 502 may be associated with a user (e.g., the user may be a primary user of encrypted device 502).

User device 504 may be a mobile device (e.g., a laptop, a smartphone, a pager, a personal digital assistant (PDA), a tablet) associated with a user. For example, the user may be a primary user of the mobile device.

System 506 may be a computing device or a plurality of computing devices that are local or remote to a location of encrypted device 502 and/or user device 504. System 506 may include a database or other storage that stores one or more recovery keys, which may respectively be uniquely associated with one or more encrypted devices. Alternatively or additionally, system 506 may be specially programmed or configured to generate a recovery key for an encrypted device. System 506 may host or otherwise administer a domain or multiple domains, and/or a workgroup or multiple workgroups.

In step 508, encrypted device 502 may be encrypted. For example, an operating system of encrypted device may be configured to use a disk encryption method to encrypt one or more storage devices of encrypted device 502. In step 510, a PIN, passcode, password, or other security method may be activated or otherwise required to secure the encrypted data of encrypted device 502. Once the security method is implemented, encrypted device 502 may require PIN entry for access. For example, when encrypted device 502 is powered on, a boot process of encrypted device 502 may prompt for a PIN to be entered in order to access encrypted device 502. Alternatively, if a user cannot remember the PIN or other security method, the user may select an option to provide a recovery key to regain access to encrypted device 502. Furthermore, if the user cannot provide the PIN or a recovery key, the user may have to reformat encrypted device 502 and reinstall the operating system of encrypted device 502, and the user might not be able to recover the encrypted data of encrypted device 502.

In some embodiments, because encrypted device 502 is inaccessible without a PIN or recovery key, a user may use user device 504 to retrieve the recovery key for encrypted device 502. For example, the user may use user device 504 to call an automated telephone support system (e.g., implemented on system 506). Alternatively or additionally, the user may use a computer-executable application (e.g., a mobile app) installed on or accessed by user device 504 to communicate with system 506 to retrieve the recovery key for encrypted device 502.

In step 512, user device 504 may transmit a request to system 506 for a recovery key for encrypted device 502. For example, the user may use user device 504 to select, as part of a telephone menu system, an option for obtaining an encrypted device recovery key. In another example, a user may speak the user's request to the automated telephone support system, which may use speech recognition to recognize that the user is seeking to obtain a recovery key for encrypted device 502. The request for the recovery key may include an identifier of the encrypted device (e.g., encrypted device 502).

In step 514, system 506 may request authentication information from the user. For example, the automated telephone support system may prompt the user to provide authentication information. In step 516, the user may provide authentication information to system 506 via user device 504. For example, the user may enter the authentication information via a telephone keypad. Alternatively or additionally, the user may speak the authentication information, which system 506 may recognize using speech recognition technology. Alternatively or additionally, the user may provide the authentication information using an application installed on user device 504. Alternatively or additionally, a user may authenticate by using a key fob or other device that, when held within a threshold proximity of a device of the user (e.g., user device 504 or encrypted device 502), may authenticate the user. For example, if the key fob of the user is within the threshold proximity of user device 504, the key fob of the user may communicate with the user device 504 of the user, which may communicate information regarding the key fob to system 506.

In step 518, system 506 may authenticate the user. In some embodiments, system 506 may transmit a confirmation of authentication of the user (e.g., to user device 504, or another device). In some embodiments, authentication of the user may be performed before the request for the recovery key (e.g., step 512) is made.

In step 520, system 506 may determine the recovery key. For example, the system may retrieve the recovery key from a database or storage, based on the identifier of the encrypted device 502. The recovery key may be unique to the encrypted device.

In some embodiments, the system may, after authenticating the user, transfer the request for the recovery key to an identity manager system. The identity manager system may determine the recovery key (e.g., step 520), and transmit the recovery key (e.g., step 522). The identity manager system may be integrated with or separate from system 506. The identity manager system may be in communication with a domain associated with an enterprise. The identity manager system may include a self-service identity manager that manages one or more of identities, credentials, and role-based access control policies.

In step 522, system 506 may transmit the recovery key to user device 504. The transmission may be made via a secure transmission channel (e.g., SSL). In some embodiments, the transmission may be made via one or more methods. In some embodiments, if the authentication information provided to the system includes a first type of authentication information, the transmission of the recovery key to the user device may be made via a first type of transmission method. If the authentication information provided to the system includes a second type of authentication information, the transmission of the recovery key to the user device may be made via a second type of transmission method different from the first type of transmission method. For example, if a user provides, as authentication information, a telephone number of the user, the recovery key may be sent in an SMS message to a telephone of the user associated with the telephone number provided by the user. Alternatively or additionally, if a user provides, as authentication information, an email address of the user, the recovery key may be sent in an email to the email address of the user.

In step 524, user device 504 may transmit the recovery key to encrypted device 502. For example, user device 504 may transmit the recovery key to encrypted device 502 using a wireless or wired transmission method. If, for example, the user is using an automated telephone support system to retrieve the recovery key, the user may receive the recovery key over the telephone (e.g., the automated telephone support system may speak the recovery key to the user).

Alternatively or additionally to step 524, user device 504 may display the recovery key. For example, the user may view the recovery key on a screen of user device 504, and then the user may manually enter the recovery key into the encrypted device 502.

In step 526, after receiving the recovery key, encrypted device 502 may initiate creation of a new PIN. The new PIN may be required in the future to allow access to encrypted device 502.

In step 528, encrypted device 528 may allow access to encrypted device 502 (e.g., to encrypted data stored on encrypted device 502).

Figure 6B:
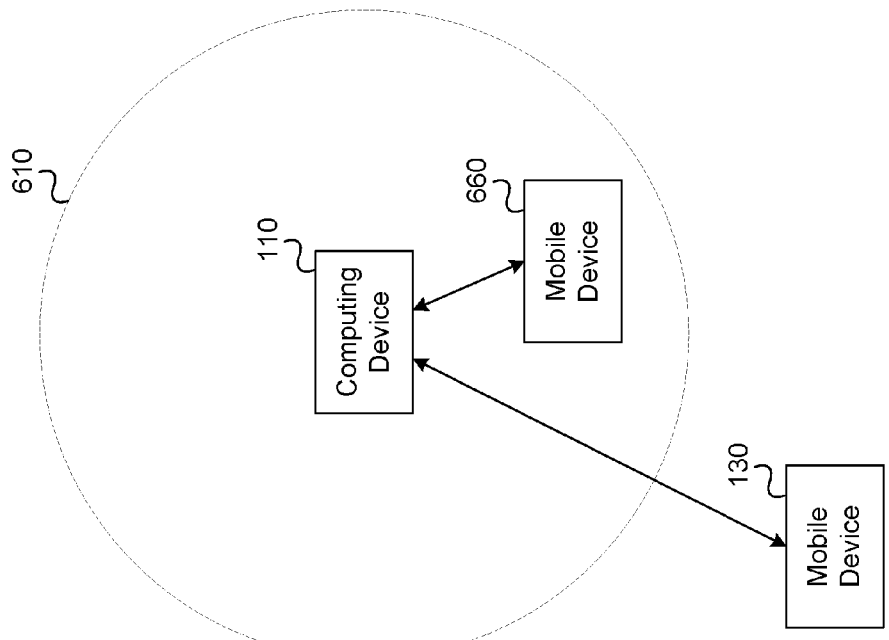
FIGS. 6A-6B depict an illustrative computing environment in accordance with various features described herein.
Figure 6A:
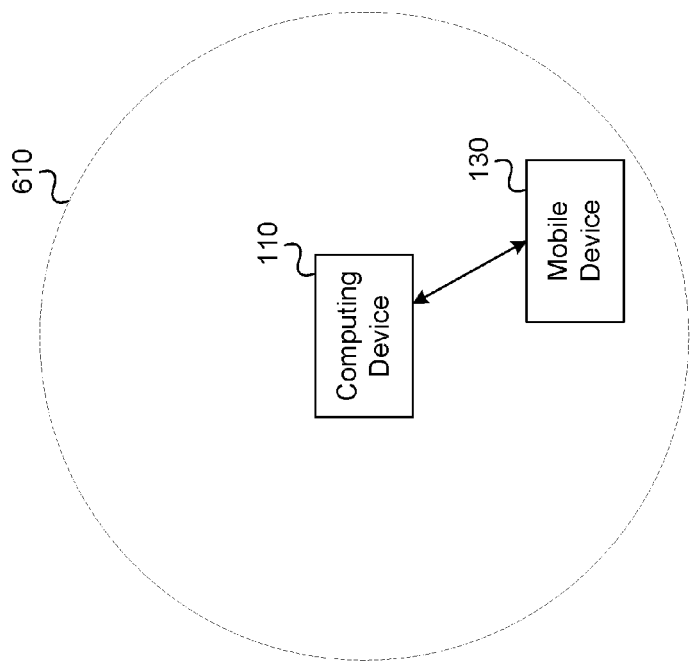

FIGS. 6A and 6B depict an illustrative computing environment in which access to an encrypted device may be recovered. Computing device 110 may be a device that includes an encrypted storage. Range 610 may be a threshold distance within which computing device 110 may communicate with a mobile device. For example, range 610 may be a range within which a wireless connection may be made between computing device 110 and a mobile device.

In some instances, a user may wish to gain access to computing device 110 using a recovery key (e.g., because the user forgot the user PIN for accessing computing device 110). Similar to the steps described above, the user may provide authentication information to a system, be authenticated, and request the recovery key for computing device 110. In some embodiments, the user may perform these steps using an automated telephone support system, using a computer-executable application running on a mobile device (e.g., mobile device 130), or the like.

In some embodiments, the system may determine a location of a mobile device associated with a user in relation to a computing device that the user is attempting to gain access to. In some embodiments, this determining may be performed as part of the authentication process. In some embodiments, this determining may be performed after the user requests a recovery key.

The user may have previously provided information regarding a mobile device associated with the user, and the information may have been stored in a user profile of the user. For example, the information regarding the mobile device may have included an identifier of the mobile device (e.g., a MAC address), an IP address, a telephone number associated with the mobile device, a name of the mobile device, and/or another identifier.

In some embodiments, the system may retrieve information (e.g., a MAC address) regarding the mobile device associated the user from the user profile of the user. The system may request information from the mobile device of the user. For example, the system may request a location of the mobile device of the user. The system may receive a location of the mobile device of the user (e.g., a GPS location, an IP address). The system may determine whether the mobile device of the user is within a threshold proximity of the computing device of the user. Alternatively or additionally, the system may request, from the mobile device of the user, information regarding whether the mobile device of the user is within a threshold proximity of the computing device of the user. For example, the mobile device may determine based on connecting—or being unable to connect—with the computing device via BLUETOOTH, near-field communication (NFC), a smart card reader, or another wireless communication protocol, a distance between the mobile device and the computing device.

For example, in FIG. 6A, if mobile device 130 is a mobile device associated with the user, and computing device 110 is a device with an encrypted storage associated with the user, and the user is requesting a recovery key for the computing device 110, the system may determine that the mobile device 130 is within a threshold proximity (e.g., range 610) of the computing device 110. Based on the mobile device associated with the user being within the threshold proximity of the computing device associated with the user, the system may provide the recovery key for the computing device to the user. In some embodiments, the system may transmit the recovery key with one or more pieces of information regarding the mobile device retrieved from the user profile of the user. For example, the system may retrieve the MAC address of the mobile device of the user, and transmit one or more packets that include the recovery key and the MAC address of the mobile device.

In some embodiments, the transmission of the recovery key to the user may be encrypted (e.g., SSL, VPN, or the like). In some embodiments, the recovery key may be encrypted before transmission to the user. Information regarding the mobile device of the user may be used in encrypting the recovery key. For example, the recovery key may be encrypted by the system using the MAC address of the mobile device of the user as the public key. After the mobile device of the user receives the encrypted recovery key, the mobile device of the user may use a private key corresponding to the MAC address of the mobile device of the user to decrypt the recovery key. In other embodiments, the MAC address and/or other identifying information of the mobile device of the user (e.g., information stored in the user profile about the mobile device) may be used as a private key, a public key, encryption salt, or the like.

In FIG. 6B, if the mobile device associated with the user (e.g., mobile device 130) is outside a threshold proximity (e.g., range 610) of the computing device associated with the user (e.g., computing device 110), the system may determine whether a mobile device of a trusted person that is trusted by the user is within a threshold proximity of the computing device associated with the user. A user may have provided, to the system, information regarding one or more trusted persons trusted by the user (e.g., coworker, spouse, or the like), and may have also provided information regarding one or more devices respectively associated with the one or more trusted persons trusted by the user. The information may be stored in a user profile associated with the user. The user may have provided information regarding how a trusted person's mobile device may be used to assist in regaining access to the user's computing device. For example, the user may have indicated that the user's spouse's device may be used anytime, at the user's home, to regain access to the user's computing device. By contrast, the user may have indicated that an IT administrator's device may be used anytime that the user is at the office, to regain access to the user's computing device.

Therefore, for example, if a user is travelling with a trusted co-worker or a supervisor, and the user's mobile phone is lost or stolen, and the user forgets the user's PIN for accessing the user's computing device 110, the system may determine a location of the mobile device (e.g., mobile device 660) of the trusted person. If the location of the mobile device of the trusted person that is trusted by the user is within a threshold proximity of the computing device of the user, then the system may provide a recovery key to the user (e.g., via an automated telephone support system, via the trusted person's mobile device, or the like) to allow the user to regain access to the user's computing device. In some instances, if the system determines that the trusted person's mobile device is within the threshold proximity of the user's computing device, and that the user's mobile device is not within the threshold proximity of the user's computing device, the system may provide the recovery key for the user's computing device via a different or a limited subset of otherwise available methods for obtaining the recovery key. For example, the system may provide the recovery key to the user via an automated telephone support system, but might not provide the recovery key via SMS message to the mobile device of the user. Alternatively or additionally, in some embodiments, the system may require additional authentication before transmitting the recovery key.

In another example, the system may receive identification information for a trusted person different from the user, the trusted person being a member of the enterprise. The system may determine a location of the user device associated with the user. The system may determine a location of a trusted device associated with the trusted person. In some embodiments, if both the location of the encrypted device is different from a location of the enterprise, and the location of the user device associated with the user is different from the location of the trusted device associated with the trusted person, the system may determine whether the location of the trusted device is within a threshold proximity of the encrypted device. If the location of the trusted device is within the threshold proximity of the encrypted device, the system may transmit the drive-encryption recovery key to the trusted device associated with the trusted person.

Thus, the system may provide for a user to gain access to the user's computing device based on a location of the user's mobile device and/or a location of a mobile device of a trusted person being within a threshold proximity to the user's computing device.

Alternatively or additionally, the system may determine whether a different mobile device of the user is within the threshold proximity of the computing device of the user. For example, a user profile of the user may store information regarding a plurality of user devices associated with the user. If a first user device (e.g., a smartphone) of the plurality of user devices associated with the user is not within the threshold proximity of the computing device, the system may determine whether a second user device (e.g., a tablet computing device) of the plurality of user devices associated with the user is within the threshold proximity of the computing device. If the second computing device is within the threshold proximity, the system may provide the recovery key to the second computing device of the user. In some embodiments, the system may provide the recovery key to the second user device based on an identifier of the second user device stored with registration information of the user (e.g., in a user profile of the user). In some embodiments, the system may require additional authentication before transmitting the recovery key to the second user device of the user.

FIGS. 7A-7D depict illustrative graphical user interfaces for a computer-executable application that may assist in obtaining a recovery key for an encrypted device. For example, a mobile device of a user (e.g., mobile device 130) may be configured to execute the computer-executable application. If the user is unable to access a computing device of the user that has an encrypted storage (e.g., computing device 110), the user may use the computer-executable application executing on the mobile device of the user to retrieve a recovery key for the computing device of the user, and allow the user to regain access to the encrypted storage.

The computer-executable application may be installed on a mobile device of the user. The computer-executable application may be downloaded to the mobile device from a public or private application store or catalog, may be directly installed onto the mobile device, and/or may be installed using a mobile device management system. The computer-executable application may include all of the features described herein, or may include a subset of the features. The computer-executable application may include different features based on a role of a user in an enterprise (e.g., the computer-executable application may make available different features to an information technology (IT) administrator than to an employee in a different role).

FIG. 7A depicts an illustrative graphical user interface of one embodiment of a main screen 710 of the computer-executable application for assisting in obtaining a recovery key for an encrypted device. Main screen 710 may include one or more options for actions that the device executing the computer-executable application may perform. One or more of the actions may be initiated by pressing a button (or selecting a region) on the graphical user interface (e.g., button 712, button 714, button 716, button 718, button 720).

Button 712 may cause the computer-executable application to request a drive recovery key. In response to pressing button 712, screen 730, depicted in FIG. 7B, may be displayed.

FIG. 7B depicts an illustrative graphical user interface of one embodiment of a screen 730 of the computer-executable application for assisting in obtaining a recovery key for an encrypted device. Screen 730 may include one or more graphical interface elements (e.g., drop-down menu 732, input field 734, input field 736, input field 738, input field 740).

Drop-down menu 732 may display a list of one or more encrypted devices that the computer-executable application may assist in obtaining a recovery key for. The list may be filtered based on one or more criteria. For example, the list may be limited to encrypted devices that the user is associated with (e.g., encrypted devices that the user is the primary user of). The list may be limited to encrypted devices within a threshold proximity of the mobile device. The list may be limited to encrypted devices that the mobile device is connected to (e.g., using a short-range near-field wireless communication method, a different wireless communication method, or a wired connection). The list may be limited to encrypted devices that the user is authorized to receive recovery keys for. For example, a user profile of the user (e.g., a profile on a system maintained by an organization of which the user is an employee) may include a list of devices for which the user is authorized to receive a recovery key. The list may include devices for which the user is a primary user. The list may include devices for which some-one other than the user is a primary user, with whom the user has a trusted relationship. For example, if a spouse of the user also is an employee of the organization, the spouse of the user may be added as someone who is trusted by the user. The computer-executable application executing on the spouse's mobile device may, therefore, include the user's encrypted device in drop-down menu 732. Thus, even if the user's mobile device is not available for receiving a recovery key for the user's computing device (e.g., if the user's mobile device battery died, the user's mobile device was lost, stolen, run over, melted, or otherwise rendered unusable), the user may be able to retrieve a recovery key to access the user's computing device, even without the user's mobile device.

The computer-executable application may receive authentication information from the user. For example, input field 734 may receive a username of the user. Input field 736 may receive an ID number of the user. Input field 738 may receive a birthday of the user. Input field 740 may receive a password of the user. One or more of the input fields may be optional or required. Screen 730 may include a visual indicator of whether a particular input field is optional or required. One or more additional input fields may be added or displayed (e.g., via a pop-up window, via a different screen, by scrolling screen 730 to reveal additional input fields).

Button 742 may, when pressed, cause the device (e.g., mobile device 130) executing the computer-executable application to connect to a system (e.g., computing device 120) to request and receive a recovery key. The computer-executable application may determine what system to connect to based on the encrypted device selected in drop-down menu 732. For example, the computer-executable application may store a table or database with associations between encrypted devices and respective systems for retrieving recovery keys for those encrypted devices. In some embodiments, the computer-executable application may transmit authentication information and receive a recovery key according to a method similar to that described in connection with FIG. 4.

Returning to FIG. 7A, after receiving a recovery key (e.g., after pressing button 742 of screen 730 depicted in FIG. 7B), the computer-executable application may connect to an encrypted device in response to a pressing of button 714. In some embodiments, pressing button 714 may cause the computer-executable application to display screen 750, depicted in FIG. 7C. Alternatively, the computer-executable application may display a pop-up window to request confirmation of what encrypted device the computer-executable application should connect to. Alternatively, the computer-executable application may connect the encrypted device selected in drop-down menu 732.

FIG. 7C depicts an illustrative graphical user interface of one embodiment of a screen 750 of the computer-executable application for assisting in obtaining a recovery key for an encrypted device. Screen 750 may include one or more graphical interface elements (e.g., drop-down menu 752, button 754, button 756, button 758, button 760).

Drop-down menu 752 may be similar to drop-down menu 732. Drop-down menu 752 may display a list of one or more encrypted devices that the computer-executable application may connect to. The list may be filtered based on one or more criteria. For example, the list may be limited to encrypted devices that the user is associated with (e.g., encrypted devices that the user is the primary user of). The list may be limited to encrypted devices within a threshold proximity of the mobile device. The list may be limited to encrypted devices that the user is authorized to receive recovery keys for. The list may include devices for which the user is a primary user. The list may include devices for which someone other than the user is a primary user, with whom the user has a trusted relationship. The list may be limited to devices for which the computer-executable application has received a recovery key. This list may be further limited to devices for which the computer-executable application has received a recovery key within a threshold amount of time (e.g., within an expiration period of the recovery key). A user may use drop-down menu 752 to select an encrypted device to connect to.

Button 754, when pressed, may cause the encrypted device to initiate a connection using BLUETOOTH to the encrypted device selected in drop-down menu 752.

Button 756, when pressed, may cause the encrypted device to initiate a connection using WIFI to the encrypted device selected in drop-down menu 752.

Button 758, when pressed, may cause the encrypted device to initiate a connection using NFC to the encrypted device selected in drop-down menu 752.

Button 760, when pressed, may cause the encrypted device to initiate a connection using another protocol to the encrypted device selected in drop-down menu 752.

One or more additional buttons may be included in screen 750, corresponding to methods by which the computer-executable application may connect to another computing device. Some embodiments might not include every button depicted in screen 750 (e.g., if the device does not have an NFC chip, then button 758 might not be included or displayed). In some embodiments, the computer-executable application may display a drop-down menu to allow selection of one or more connection methods, and initiate the connection after a "connect" button is pressed.

Returning to FIG. 7A, button 716 may, when pressed, cause the computer-executable application to send a recovery key to an encrypted device. In some embodiments, button 716 might not be enabled unless a recovery key has been received (e.g., button 712 has been pressed), and the computer-executable application is connected to an encrypted device (e.g., button 714 has been pressed). After button 716 is pressed, the computer-executable application may send the recovery key to the encrypted device, which may cause the encrypted device to allow access to the encrypted device. For example, if the encrypted device is encrypted using BITLOCKER, and the recovery key is a BITLOCKER drive recovery key, the mobile device may send the BITLOCKER drive recovery key to the encrypted device that is encrypted using BITLOCKER, which may allow a BITLOCKER PIN to be reset, and the encrypted device to be accessed.

In some embodiments, screen 710 may include a button to allow for a recovery key to be displayed. For example, some encrypted devices might not allow for a mobile device to connect to the encrypted device to transmit the recovery key, and may instead require a user to manually enter the recovery key in order to regain access to the encrypted device. Therefore, after receiving the recovery key, screen 710 may allow selection of a button to view the recovery key. For example, button 716 may, in some embodiments, be replaced with a button that causes the computer-executable application to display the recovery key.

Button 720 may, when pressed, cause the mobile device to initiate a telephone call to a telephone support service. For example, if a user is an employee of an organization, the organization may include an automated telephone support system (e.g., a help desk). The automated telephone support system may, for example, allow a user to provide authentication information, become authenticated, provide an identifier of the encrypted device, and receive a recovery key for the encrypted device.

Button 720, when pressed, may initiate the telephone call using an application other than the computer-executable application. For example, button 720 may initiate a function call to a software development kit (SDK) of an operating system of the mobile device that causes a telephone application of the mobile device to launch and prompt and/or initiate a call using a telephone number provided by the computer-executable application. For example, the telephone number provided by the computer-executable application may be a telephone number of the automated telephone support system of the organization. In some embodiments, the computer-executable application may transmit an identifier of the computer-executable application to the system of the organization, indicating that the user has initiated a call to the automated telephone support system of the organization.

The automated telephone support system of the organization may determine, based on the information sent by the computer-executable application, that the user is calling from a telephone number associated with the mobile device from which the computer-executable application sent the identifier. Based on the identifier sent by the computer-executable application, the automated telephone support system may provide an accelerated authentication process.

Alternatively or additionally, the computer-executable application may send additional information regarding actions taken by the user in the computer-executable application before placing the call to the automated telephone support system. For example, if the user pressed button 712 to request a recovery key, but the request for the recovery key failed, and then the user pressed button 720 to call phone support, the automated telephone support system may automatically offer the user support regarding requesting a recovery key. In another example, if the user pressed button 714 to connect to an encrypted device, but the attempt to connect to the encrypted device failed, and then the user pressed button 720 to call phone support, the automated telephone support system may automatically offer the user support regarding connecting to an encrypted device.

In some embodiments, the computer-executable application may allow a user to access additional or different enterprise services (e.g., other than accessing or retrieving a recovery key). Button 718 may, when pressed, allow a user to access another enterprise service.

FIG. 7D depicts an illustrative graphical user interface of one embodiment of a screen 770 of the computer-executable application for accessing one or more additional enterprise services Screen 770 may include one or more graphical interface elements (e.g., drop-down menu 772, input field 774, input field 776, input field 778, button 780).

Drop-down menu 772 may allow a user to select an enterprise service to access. For example, an enterprise service could be videoconference, long-distance or international phone calls, a research service, a concierge service, a travel agency, file access, a virtual private network (VPN), expense reporting, task management, sales management, networking, or another enterprise service.

The computer-executable application may receive authentication information from the user. For example, input field 774 may receive a username of the user. Input field 776 may receive an ID number of the user. Input field 778 may receive a password of the user. One or more of the input fields may be optional or required. Screen 770 may include a visual indicator of whether a particular input field is optional or required. Different enterprise services may require different authentication information. The visual indicator of whether a particular input field is optional or required may change based on the enterprise service selected in drop-down menu 772. One or more additional input fields may be added or displayed (e.g., via a pop-up window, via a different screen, by scrolling screen 770 to reveal additional input fields), for example, based on what enterprise service is selected in drop-down menu 772.

Button 780, when pressed, may initiate a connection to the enterprise service selected in the drop-down menu 772. In some embodiments, after the connection is initiated, the computer-executable application may provide the authentication information in input fields 774, 776, and 778 to a system associated with the enterprise, to authenticate the user for accessing the authentication process. In some embodiments, if the user has already authenticated within a threshold period of time, the authentication process for accessing the enterprise service may be accelerated or skipped. In some embodiments, additional authentication may be required, based on the particular enterprise service selected.

In some embodiments, accessing an enterprise service may cause the computer-executable application to put the mobile device into a particular mode associated with the enterprise service. For example, if the enterprise service is a videoconference service, connecting to the service may cause a camera of the mobile device to be activated, which may record video and/or still images of the user or the user's surroundings, and also display a video and/or still images of the party or parties with whom the user is videoconferencing. In another example, if the enterprise service is a file sharing service (e.g., allowing the user to access files on an enterprise system), connecting to the enterprise service may cause the computer-executable application to display a visual representation of a file structure of the enterprise to which the user has access, and allow the user to perform one or more of view, print, email, edit, share, move, or otherwise access files.

In some embodiments, a system may provide access to an enterprise service based on one or more types of authentication information provided to the system. For example, if a user provides first and second (e.g., required and optional, basic and advanced, optional and optional, required and required, basic and basic, advanced and advanced) authentication information. If the second authentication information is a first type of authentication information, the system may provide access to a first type of enterprise service. If the second authentication information is a second type of authentication information, the system may provide access to a second type of enterprise service different from the first type of enterprise service.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   receiving registration information for a user, the registration information comprising a phone number associated with a user device associated with the user;
   receiving, by a computing device, authentication information for the user, the authentication information comprising an identification number of the user and a birthday of the user;

authenticating, by the computing device, the user, based on the authentication information;

receiving, by the computing device, a request to provide a drive-encryption recovery key for an encrypted device that is different from the user device and that is a member of a domain associated with an enterprise, the request comprising an identifier of the encrypted device, the encrypted device being associated with the user, the encrypted device being encrypted using a whole-disk encryption method, the drive-encryption recovery key comprising a string that, when provided to the encrypted device, causes the encrypted device to allow access to the encrypted device, the drive-encryption recovery key being unique to the encrypted device;

determining the drive-encryption recovery key for the encrypted device; and sending, to the phone number associated with the user device, a short message service (SMS) message comprising the drive-encryption recovery key.

2. The method of claim 1, comprising:

determining whether the user device is within a threshold proximity of the encrypted device;

in a case that the user device is not within a threshold proximity of the encrypted device:
  requesting additional authentication information before sending the drive-encryption recovery key; and
  sending the drive-encryption recovery key to a different user device associated with the user.

3. The method of claim 2, wherein the registration information for the user comprises an identifier of the different user device associated with the user,
  wherein sending the drive-encryption recovery key to the different user device associated with the user comprises sending the drive-encryption recovery key to the different user device using the identifier of the different user device.

4. The method of claim 3, wherein receiving the authentication information for the user comprises receiving the authentication information via a secure application installed on the user device associated with the user, and wherein the method comprises:
  sending the drive-encryption recovery key to the secure application installed on the user device associated with the user.

5. The method of claim 4, comprising:

sending, by the secure application installed on the user device, the drive-encryption recovery key to the encrypted device, thereby causing the encrypted device to be accessible by the user.

6. The method of claim 5, wherein receiving the authentication information for the user comprises receiving the authentication information from the user via an automated telephone support system,
  wherein receiving the request to provide the drive-encryption recovery key for the encrypted device comprises receiving the request via the automated telephone support system, and
  wherein the method comprises:
    determining whether a telephone number of a telephone the user is using to access the automated telephone support system is the phone number associated with the user device;
    in a case that the telephone number of the telephone the user is using to access the automated telephone support system is the phone number associated with the user device, performing an accelerated authentication of the user;
    in a case that the telephone number of the telephone the user is using to access the automated telephone support system is not the phone number associated with the user device, performing additional authentication of the user; and
    providing the drive-encryption recovery key to the user via the automated telephone support system.

7. The method of claim 6, comprising:

transferring, to an identity manager system, the request to provide the drive-encryption recovery key; and sending, from the identity manager system, the drive-encryption recovery key to the user device.

8. The method of claim 7, wherein the identity manager system is configured to communicate with the domain associated with the enterprise, and comprises a self-service identity manager that manages at least one of identities, credentials, and or role-based access control policies.

9. The method of claim 7, comprising:

determining a location of the encrypted device; and in a case that the location of the encrypted device is different from a location of the enterprise, requesting additional authentication information before sending the drive-encryption recovery key.

10. The method of claim 9, comprising:

receiving identification information for a trusted person different from the user, the trusted person being a member of the enterprise;

determining a location of the user device associated with the user;

determining a location of a trusted device associated with the trusted person;

in a case that both the location of the encrypted device is different from a location of the enterprise, and the location of the user device associated with the user is different from the location of the trusted device associated with the trusted person:
  determining whether the location of the trusted device is within a threshold proximity of the encrypted device; and
  in a case that the location of the trusted device is within the threshold proximity of the encrypted device, sending the drive-encryption recovery key to the trusted device.

11. The method of claim 10, comprising:

in a case that the location of the encrypted device is at the location of the enterprise, sending, over a network associated with the enterprise, to the encrypted device, a trusted key different from the drive-encryption recovery key, wherein the trusted key causes the encrypted device to allow access to the encrypted device.

12. The method of claim 11, comprising:

providing, based on authenticating the user, access to an enterprise service of the enterprise.

13. The method of claim 12, wherein the authentication information for the user comprises additional authentication information, and
  wherein the method comprises:
    in a case that the additional authentication information is a first type of authentication information, providing access to a first enterprise service of the enterprise; and
    in a case that the additional authentication information is a second type of authentication information different from the first type of authentication information, providing access to a second enterprise service of the enterprise, the second enterprise service being different from the first enterprise service.

14. The method of claim 11, wherein the authentication information for the user comprises additional authentication information, and
wherein the method comprises:
in a case that the additional authentication information is a first type of authentication information, sending the drive-encryption recovery key to the user device via a first transmission method; and
in a case that the additional authentication information is a second type of authentication information different from the first type of authentication information, sending the drive-encryption recovery key to the user device via a second transmission method different from the first transmission method.

15. The method of claim 14, comprising:
receiving a media access control (MAC) address of the user device associated with the user;
storing the MAC address of the user device associated with the user in a user profile of the user;
after the request to provide the drive-encryption recovery key for the encrypted device, receiving the MAC address of the user device associated with the user from the user profile of the user; and
sending, to the user device, the drive-encryption recovery key and the MAC address of the user device.

16. The method of claim 15, comprising:
recording one or more words spoken by the user; and
performing voice recognition of the user based on the one or more words spoken by the user,
wherein authenticating the user based on the authentication information comprises authenticating the user based on the voice recognition of the user.

17. The method of claim 16, comprising:
before sending the drive-encryption recovery key to the user device, encrypting, by the computing device, the drive-encryption recovery key by using a MAC address of the user device as a public encryption key,
wherein the encrypted drive-encryption recovery key is decryptable using a private decryption key corresponding to the MAC address of the user device.

18. Non-transitory computer-readable media storing executable instructions that, when executed by one or more processors, cause a system to:
receive registration information for a user, the registration information comprising a phone number associated with a user device associated with the user;
receive authentication information for the user, the authentication information comprising an identification number of the user and a birthday of the user;
authenticate the user, based on the authentication information;
receive a request to provide a drive-encryption recovery key for an encrypted device that is different from the user device and that is a member of a domain associated with an enterprise, the request comprising an identifier of the encrypted device, the encrypted device being associated with the user, the encrypted device being encrypted using a whole-disk encryption method, the drive-encryption recovery key comprising a string that, when provided to the encrypted device, causes the encrypted device to allow access to the encrypted device, the drive-encryption recovery key being unique to the encrypted device;
determine the drive-encryption recovery key for the encrypted device; and
send, to the phone number associated with the user device, a short message service (SMS) message comprising the drive-encryption recovery key.

19. The non-transitory computer-readable media of claim 18, wherein the executable instructions, when executed by the one or more processors, cause the system to:
receive the authentication information for the user via a secure application installed on the user device; and
send the drive-encryption recovery key to the secure application installed on the user device.

20. The non-transitory computer-readable media of claim 18, wherein the executable instructions, when executed by the one or more processors, cause the system to:
receive the authentication information for the user via an automated telephone support system;
receive the request to provide the drive-encryption recovery key for the encrypted device via the automated telephone support system; and
provide the drive-encryption recovery key to the user via the automated telephone support system.

21. The non-transitory computer-readable media of claim 18, wherein the executable instructions, when executed by the one or more processors, cause the system to:
transfer, to an identity manager system, the request to provide the drive-encryption recovery key,
wherein the identity manager system is configured to send the drive-encryption recovery key to the user device.

22. A system associated with an enterprise, the system comprising:
an encrypted device that is a member of a domain associated with the enterprise, the encrypted device being associated with a user, the user being a primary user of the encrypted device, the encrypted device comprising: one or more first processors; an encrypted storage encrypted using a whole-disk encryption method; and first non-transitory memory storing executable instructions that, when executed by the one or more first processors, cause the encrypted device to:
receive a drive-encryption recovery key for the encrypted device, the drive-encryption recovery key comprising a string, the drive-encryption recovery key being unique to the encrypted device; and
in response to receiving the drive-encryption recovery key, reset an access PIN of the encrypted device, and allow access to the encrypted device;
a mobile device associated with the user, the user being a primary user of the mobile device, the mobile device comprising: one or more second processors; and second non-transitory memory storing executable instructions that, when executed by the one or more second processors, cause the mobile device to:
provide authentication information for the user, the authentication information comprising an identification number of the user and a birthday of the user;
receive confirmation of authentication of the user, based on the authentication information;
transmit a request for the drive-encryption recovery key for the encrypted device, the request comprising an identifier of the encrypted device; and
receive the drive-encryption recovery key; and
a key management device associated with the enterprise, the key management device comprising: one or more third processors; and third non-transitory memory storing executable instructions that, when executed by the one or more third processors, cause the system to:
receive the authentication information for the user;

authenticate the user, based on the authentication information;
send the confirmation of authentication of the user;
receive the request to provide the drive-encryption recovery key for the encrypted device;
determine the drive-encryption recovery key for the encrypted device; and
transmit the drive-encryption recovery key to the mobile device.

23. The system of claim 22, wherein the executable instructions of the key management device, when executed by the one or more third processors, cause the system to:
receive the authentication information for the user via a secure application installed on the mobile device; and
send the drive-encryption recovery key to the secure application installed on the mobile device.

24. The system of claim 22, wherein the executable instructions of the key management device, when executed by the one or more third processors, cause the system to:
receive the authentication information for the user via an automated telephone support system;
receive the request to provide the drive-encryption recovery key for the encrypted device via the automated telephone support system; and
provide the drive-encryption recovery key to the user via the automated telephone support system.

25. The system of claim 22, comprising an identity manager system, and
wherein the executable instructions of the key management device, when executed by the one or more third processors, cause the system to:
transfer, to the identity manager system, the request to provide the drive-encryption recovery key, and
wherein the identity manager system is configured to send the drive-encryption recovery key to the mobile device.

26. The system of claim 25, wherein the identity manager system is configured to:
communicate with the domain associated with the enterprise, and
manage at least one of identities, credentials, or role-based access control policies.

* * * * *